(12) United States Patent
Fava et al.

(10) Patent No.: US 7,469,629 B2
(45) Date of Patent: Dec. 30, 2008

(54) HOMOGENIZING MIXER

(75) Inventors: Enrico Fava, Cento (IT); Anzio Storci, Collecchio (IT)

(73) Assignees: FAVA S.p.A., Ferrara (IT); STORCI S.p.A., Parma (IT)

( * ) Notice: Subject to any disclaimer, the term of this patent is extended or adjusted under 35 U.S.C. 154(b) by 351 days.

(21) Appl. No.: 11/345,413

(22) Filed: Feb. 1, 2006

(65) Prior Publication Data

US 2006/0182866 A1 Aug. 17, 2006

(30) Foreign Application Priority Data

Feb. 16, 2005 (IT) .......................... MI2005A0225

(51) Int. Cl.
*A23L 1/00* (2006.01)

(52) U.S. Cl. .................... 99/472; 99/330; 99/348; 99/352; 366/79; 366/139; 425/202; 425/203; 425/208

(58) Field of Classification Search ........... 99/327–333, 99/352–355, 348, 477–479, 472; 366/81, 366/85, 318–324, 79, 139; 425/202–209
See application file for complete search history.

(56) References Cited

U.S. PATENT DOCUMENTS

| 1,991,959 | A | | 2/1935 | Roser |
|---|---|---|---|---|
| 3,216,375 | A | | 11/1965 | Ernst |
| 3,710,983 | A | | 1/1973 | Ricciardi |
| 4,054,271 | A | | 10/1977 | Lanzillo et al. |
| 4,121,301 | A | * | 10/1978 | De Francisci ................. 99/353 |
| 4,300,954 | A | * | 11/1981 | de Monterey et al. .... 106/501.1 |
| 4,309,223 | A | * | 1/1982 | Rouwhorst et al. .......... 106/496 |
| 4,347,003 | A | * | 8/1982 | Anders ......................... 366/75 |
| 5,126,159 | A | * | 6/1992 | Manser et al. ............... 426/549 |
| 5,227,936 | A | * | 7/1993 | Strickler et al. ........... 360/97.02 |
| 5,464,640 | A | * | 11/1995 | Dalbon ........................ 426/231 |
| 5,993,187 | A | | 11/1999 | Manser et al. |

OTHER PUBLICATIONS

European Search Report, Sep. 4, 2006.

* cited by examiner

*Primary Examiner*—Timothy F. Simone
(74) *Attorney, Agent, or Firm*—James V. Costigan; Hedman & Costigan, P.C.

(57) ABSTRACT

A homogenising and kneading mixer comprising a premixer (12) placed upstream from a kneader and at least two kneading screws (20, 21) in turn connected with a vacuum tank (37) feeding final compression screws (44), in which the kneader has a containment cylinder (19*a*, 19*b*) and respective kneading screws (20, 21) realised in portions of different diameter, a first portion of smaller diameter (19*a*, 20*a*, 21*a*) arranged at a pasta scrap feeding conduit (25) and a second portion of greater diameter (19*b*, 20*b*, 21*b*) arranged at the premixer (12).

9 Claims, 2 Drawing Sheets

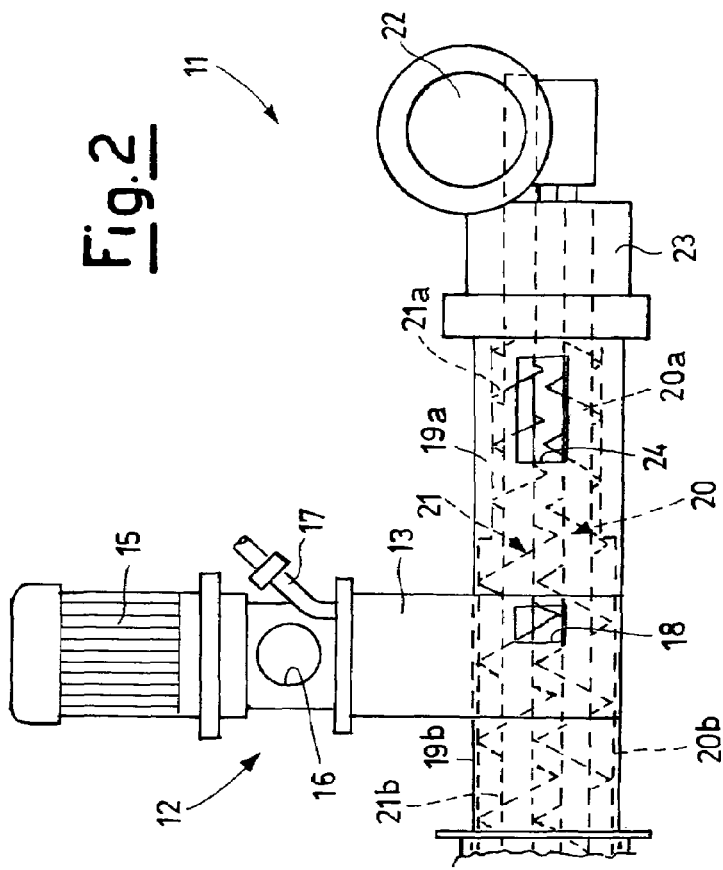
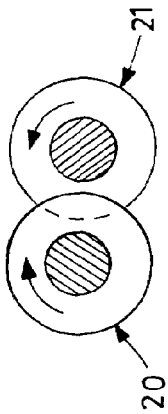
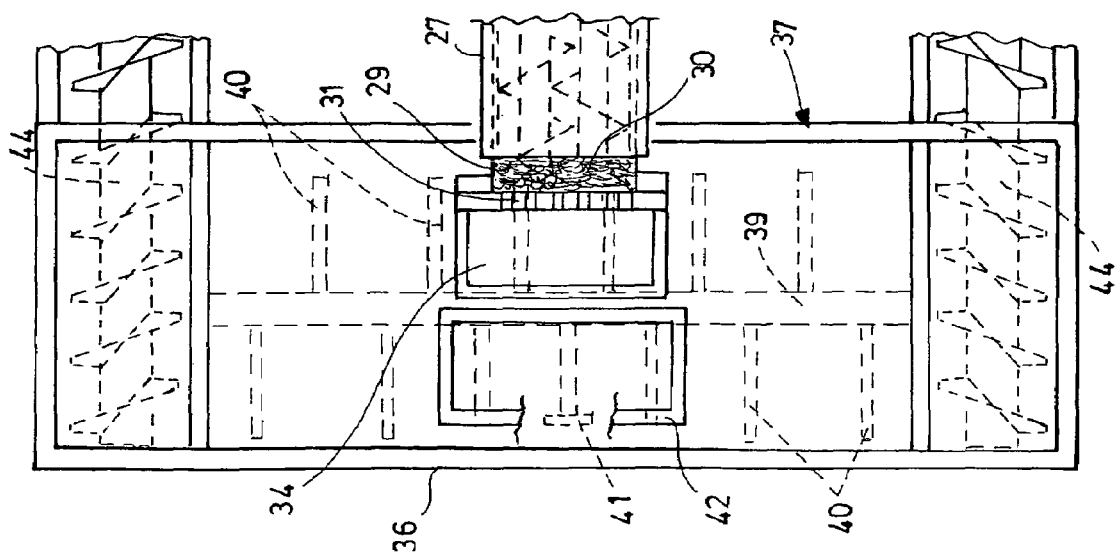

HOMOGENIZING MIXER

CROSS REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISK

Not Applicable

REFERENCE TO A MICROFICHE APPENDIX

Not Applicable

BACKGROUND OF THE INVENTION

1. Field of the Invention

The present invention refers to a kneading and homogenising mixer.

2 Description of Related Art

In the production of dough, it is known that a mixture, in order to be "well made", must have a uniform moistening of the durum wheat flour or other flour or in any case other ground grains which compose it. With the production of the dough it is intended either the production of pasta or dough for bread and baked products.

To such end, for many years mixer machines have used specific centrifugal premixer devices in order to improve the moistening uniformity.

Storci srl has for several years produced a premixer machine which has optimised this step thanks to a particular method of introduction of the water onto the base of a cylinder in which a shaft rotates with a screw in the initial part, followed by particular paddles.

It must be taken into account that the traditional mixers, in which the premixing is realised in the premixer group, are equipped with paddle shafts which move and overturn the product in order to obtain a mixture still more worked and uniform in a traditional tank. This before the mixture, by means of an appropriate gear pump, is caused to enter into a vacuum mixer, which has the double function of removing the air from the dough and feeding and distributing it to one or more compression screws, where kneading is generated due to the compression. It is indeed the kneading which represents the fundamental step for the formation of the gluten.

It should be remembered that, since the beginnings of homemade production, when the compression screws did not yet exist and the pasta was extruded through the piston press, the dough was previously kneaded, worked with the mechanical action necessary to obtain the formation of gluten, which would be then completed during the compression.

Therefore, based on that previously described regarding the present state of the art in this particular field, one object of the present invention is to realise a machine part or device which is capable of attaining optimal results.

In particular, object of the invention is to realise one single treatment element which may actuate the treatments now carried out by the main mixer tank, in which the fresh production trimmings enter, and by the gear pump, which is a valve group through which the product passes, which today separates the main mixer tank from the vacuum tank.

BRIEF SUMMARY OF THE INVENTION

The invention provides a homogenizing and kneading mixer comprising a premixer (12) placed upstream from a kneader with at least two kneading screws (20, 21) in turn connected with a vacuum tank (37) feeding final compression screws (44), in which said kneader has a containment cylinder (19a, 19b) and respective kneading screws (20, 21) realised in different diameter portions, a first portion of smaller diameter (19a, 20a, 21a) arranged at a pasta scrap feeding conduit (25) and a second portion greater diameter (19b, 20b, 21b) arranged at said premixer (12).

Object of the present invention is that of realising a mixer which resolves the technical problems referred to above, while presenting a great functional and structural simplicity.

Still another object is that of having a mixer in which the feeding of fresh dough and fresh production trimmings is simplified and of prompt realisation.

These objects according to the present invention are achieved by realising a kneading and homogenising mixer as set forth in claim 1.

Further characteristics of the invention are made clear in the subsequent claims.

BRIEF DESCRIPTION OF THE SEVERAL VIEWS OF THE DRAWINGS

The characteristics and advantages of a homogenising mixer according to the invention will be clearer from the following exemplifying and not limiting description referred to the attached schematic drawings in which:

FIG. 2 is a partial top plan view of the mixer shown in FIG. 1; and

FIG. 3 is a cross-section view of the single kneading screws.

DETAILED DESCRIPTION OE THE INVENTION

Figure 1:
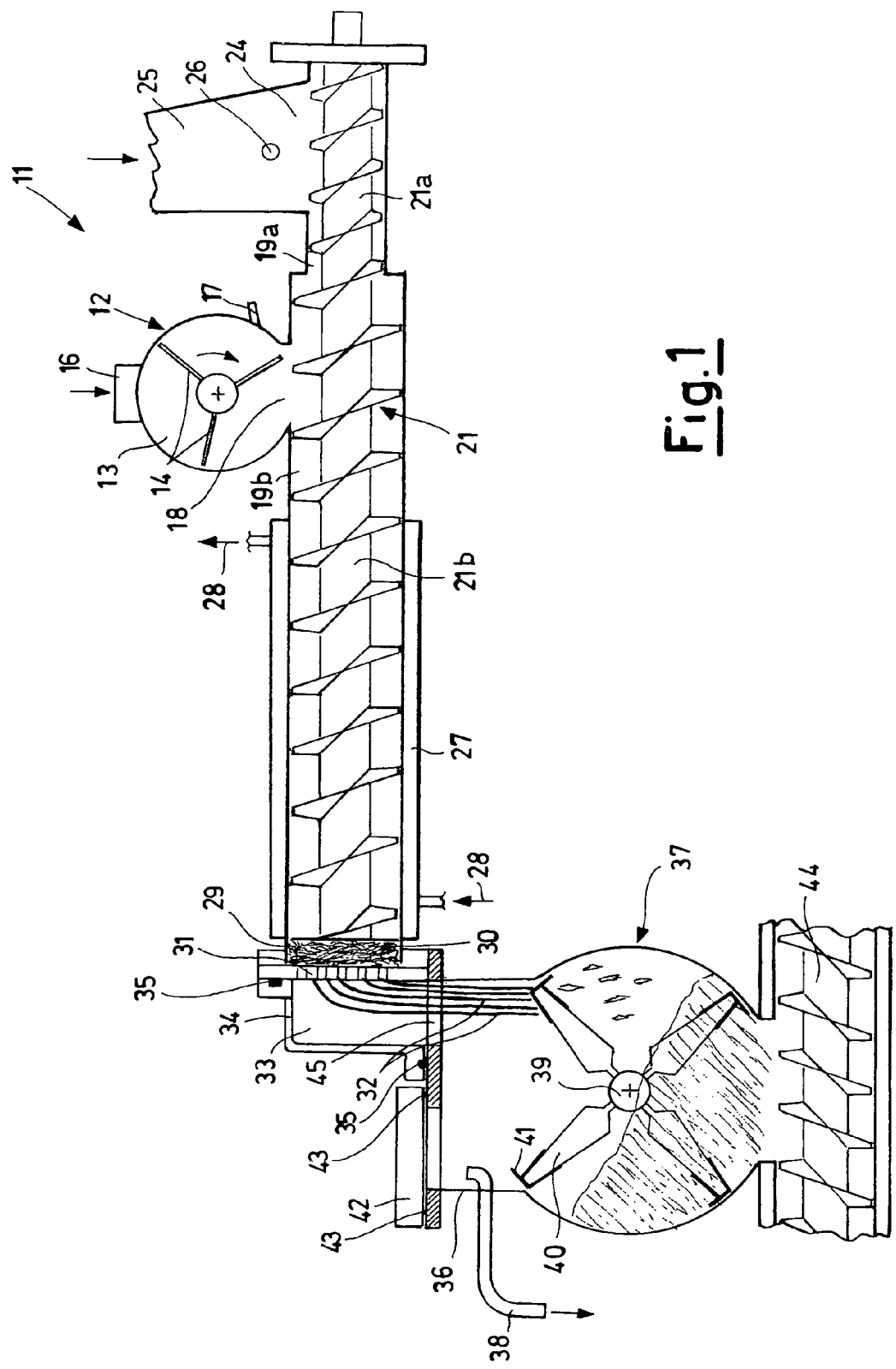
FIG. 1 is a cross-section elevation of a mixer according to the present invention.

With reference to the figures, a homogenising and kneading mixer 11 is shown according to the invention in one of its general exemplifying and not limiting embodiments.

The mixer 11 comprises a premixer 12 composed of a casing 13, within which a paddle mixing member 14 is placed which is caused to rotate by a motor 15. A durum wheat flour feed conduit 16 and respectively a water feed conduit 17 are inserted into the casing 13 of the premixer 12.

The premixer 12 is connected through a mouth or opening 18 to a containment structure or kneading cylinder 19a and 19b of a pair of kneading screws 20 and 21 which realise a kneader. The kneading screws 20 and 21 are engaged with each other, partly penetrating each other and rotating in opposite direction, counter-rotating, or in the same direction, therefore co-rotating. In fact the kneading screws 20 and 21 are driven to rotate by a head gearmotor 22 with the interposition of a gear reduction and reverse group 23 for the counter-rotating solution or free reduction group for the co-rotating solution (not shown).

A first portion 19a of the containment structure 19 of the kneading screws 20 and 21 has a reduced internal size, in order to contain the first initial sections of reduced diameter 20a and 21a of the kneading screws 20 and 21. In this first portion 19a of the containment structure 19 of the kneading screws 20 and 21, a first opening 24 is inserted above for the feeding of scraps of trimmings of fresh production pasta through a suitable conduit 25. The conduit 25 moreover foresees a feeler 26 adapted to detect the upward accumulation of the fed trimmings, thus to accelerate the speed of rotation of the gearmotor 22 and hence the rotation of the kneading screws 20 and 21.

A second portion 19*b* of the containment structure 19 of the kneading screws 20 and 21 has a greater internal size with respect to the first in order to contain second sections of greater diameter 20*b* and 21*b* of the kneading screws 20 and 21. It is in this second portion 19*b* of the containment structure 19 of the kneading screws 20 and 21 that the mouth or opening 18 is inserted above, connected to the premixer 12 from which the premixed dough of durum wheat flour and water arrives. It is important to point out that the paddles 14 of the premixer 12 in rotation describe trajectories tangent to spirals of the second portion of greater diameter 20*b*, 21*b* of the kneading screws 20, 21, determining a reduction of space in which the product would stop, and stagnate.

In this second portion 19*b* of the containment structure, an external jacket 27 is situated for the fluid circulation cooling, as indicated by the arrows 28.

The kneading screws 20 and 21 terminate in a chamber 29, in which a certain quantity of compressed pasta 30 is arranged before a die plate or holed plate 31, whose holes may be of different shape and section. The extruded product exits from such holes, for example extruded round pasta or wide, straight pasta 32 of different section. The placement of the holed plate 31 at the end of the kneading screws 20, 21, preceded by a product bearing 30, is such to generate a sufficient strength to maintain the vacuum of the subsequent tank feeding the compression screws.

More precisely, the exiting pasta 32 penetrates into a connection chamber 33 realised through a vacuum-sealed casing 34, provided with gaskets 35 at the holed plate 31 and at a containment structure 36 of an underlying vacuum tank 37.

The containment structure 36 is maintained in a vacuum thanks to a conduit 38 connected to a vacuum source (not shown), thus to realise the vacuum tank 37, at whose interior a paddle 40 mixer 39 is arranged. In particular, at least the paddles 40 placed in correspondence with the wide, straight pasta 32, which arrives from a lower opening 45 of the casing 34, has cutting ends 41. These cutting ends 41 operate on the pasta 32 exiting from the holed plate 31 within the casing, dividing it and favouring its treatment in the vacuum tank 37.

Above, the containment structure 36 foresees a sealed inspection door 42, it too provided with gasket 43.

Finally, below the vacuum tank 37, a pair of compression screws 44 is connected and fed, which produce the final action on the pasta thus realised.

The vacuum tank 37 has the double function of taking away the air from the dough and distributing to one or more compression screws 44.

In this manner, the main mixer tank present in traditional known presses is removed. The homogenising tank of the invention is thus capable of receiving at the same time the moist durum wheat flour from the premixer 12 and the return scraps from the conduit 25 in proportion to the derived quantity. This quantity is on average 15/20% of the total as product derived from the production of long pasta and 50% in the case the press produces laminated and sliced Bologna pasta or bow-tie pasta. This means eliminating a part of the press which, in addition to oxidising the dough, is also considered quite difficult to clean.

Overall, it is seen that the above indicated mixer is substantially constituted by the coupling between premixer and a particular pair of homogenising kneading cylinders 19*a*, 19*b* with two diameters containing special kneading screws 20, 21, also with two diameters 20*a*, 20*b* and 21*a*, 21*b*.

In the first part of the cylinder 19*a* of reduced section, which is around 20-30%, preferably 25%, of the greater cylinder, the pasta scraps are introduced from the above described previous workings.

This first part of the screws 20*a*, 21*a* functions as a simple screw conveyor, and is one of the important elements of the invention. Indeed, this first part of the cylinder 19*a* and screws 20*a*, 21*a* acts as doser element, bringing the pasta scrap, in proportion to the foreseen maximum quantity, into the widest section of the cylinder 19*b*, where the moist durum wheat flour is introduced from the premixer 12, realising the dough. In this step, the two elements, the new dough from the premixer and the pasta scraps, are mixed, also thanks to particular sections, while the product begins to compress according to a modest pressure regulated by appropriate strength elements which at the same time produce the first step of kneading and the vacuum seal. It must be noted how the work is not onerous, the temperature of the dough is limited and may even be lowered to lower values with respect to those used for the dough water, thanks to the presence of the external jacket 27.

One succeeds, according to the invention, to cold knead, with all of the advantages that this factor may bring to the final product. Furthermore, the very limited presence of air will exalt colour and transparency, due to the lack of oxidation.

It has been seen how the dough is, at the end of the course, in the form of wide, straight pasta or the like 32 exiting from the final holed plate 31 and is cut and crushed by the paddles 40 of the mixer 39 of the vacuum tank 37.

Thus one has a vacuum tank 37 fed by pre-kneaded product, uniformly combined with the scraps and water, which is spread perfectly throughout the mass.

Specific characteristics must be underlined of this new and original mixer.

First, an original mechanical coupling is foreseen which generates a very limited space between the paddles 14 of the premixer 12 and the spirals of the kneading screws 20*b* and 21*b*.

In this manner, one avoids creating blockage of then dough feeding. Indeed, such absence of space is fundamental both for the hygienic aspect and to avoid flooding.

If there is an increase of dough, an immediate increase of the screw speed is such to ensure that everything arriving from the premixer 12 is transported away. The proposed solution of the invention ensures that if there is an accidental increase in dough, the set equilibrium is disrupted and, instantaneously, there is a greater load on the premixer 12 with a rise in feeding stress.

This variation, once detected, instantaneously determines the increase in speed of the screws 20, 21, with the withdrawal of the excess dough, permitting the premixer 12 to maintain its regular load.

Second, it should be underlined how having the foreseen screws 20*a*, 20*b* and 21*a*, 21*b* and containment cylinder 19*a*, 19*b* of different size, varying between 20 and 50%, obliges the fresh scrap to enter only in a predetermined percentage.

This it is permitted to have a feeding of scraps correlated with the size of the second part of the screws and cylinder.

A feeding of the scraps through lesser diameter determines that the scraps themselves may be removed only in the quantity tied to the geometric ratio with the part following the kneading screws. Thus, if more scrap product should arrive, this would still be removed in the maximum predetermined quantity, also increasing the feeding of the part of the screws of greater diameter.

In fact, as already said, to manage possible excess, a feeler 26 of product or scrap presence placed in the entrance conduit 25 may accelerate the speed of the screws by a percentage and for a time necessary to maintain empty the final portion of the conduit with vertical wall on one side and sloped wall on the other, like a small lung. In this manner, the higher-than-normal arrival of scraps is automatically absorbed by the system without generating mishaps.

Third, the original coupling between kneader (20, 21; 19a, 19b) and vacuum tank 37 whose central paddles 40 are conceived for cutting into pieces the wide, straight pasta 32 which exits from the kneader. In this manner, the wide, straight pasta 32 are adapted for the feeding of the compression screws 44. Furthermore, the misalignment of the kneading screws with respect to the vacuum tank through the presence of the connection chamber 33 realised through vacuum-sealed casing 34, provided with gaskets 35 with respect to the holed plate 31 and the containment structure 36 of the vacuum tank 37, permits a greater seal. Such arrangement, moreover, determines that the kneading screws 20, 21 may be easily dismantled.

It was thus seen that a homogenising mixer according to the present invention realises the previously highlighted objects.

In particular, it has been seen that a homogenising mixer according to the present invention, essentially comprising a premixer group, a pair of homogenising kneading cylinders of two diameters containing special kneading screws, these too also with two diameters, realise a machine which has mixture and kneading times reduced to about ten seconds.

And such homogenising and kneading mixer is adapted for the treatment of durum wheat flour, other flour and other ground grain pasta and dough, both for the production of the pasta and baked products such as bread, pizza etc.

The mixer of the present invention thus conceived is susceptible to numerous modifications and variations, all coming under the same inventive concept.

Furthermore, in practice, the materials used, as well as their dimensions and components, may be of any type according to technical needs.

The invention claimed is:

1. Homogenizing and kneading mixer comprising a premixer (12) placed upstream from a kneader having at least two kneading screws (20, 21) connected to a vacuum tank (37) feeding final compression screws (44), in which said kneader has a containment cylinder (19a, 19b) and respective kneading screws (20, 21) having different diameters, a first portion of said kneading screws having a smaller diameter (19a, 20a, 21a) are arranged at a pasta scrap feeding conduit (25) and a second portion of said kneading screws having a greater diameter (19b, 20b, 21b) are arranged at said premixer (12) which is provided with paddles (14) arranged on said premixer (12) which when rotated have a trajectory which is tangent to spirals on said second portion of said kneading screws of greater diameter (20b, 21b) of said kneading screws (20, 21).

2. Mixer according to claim 1, characterised in that at a downstream end of said containment cylinder (19a, 19b) and said kneading screws (20, 21), a holed plate (31) is placed which generates wide, straight pasta (32) and faces said vacuum tank (37) which is in communication with a vacuum-sealed chamber (33) that is aligned with said containment cylinder (19a, 19b) and is positioned above said vacuum tank, a chamber (29) positioned upstream of said holed plate, said chamber (29) being sized to contain a quantity of compressed pasta (30), which acts as a vacuum seal.

3. Mixer according to claim 2, characterised in that said vacuum tank (37) has a paddle (40) mixer (39) positioned therein, in at least the paddled (40) have cutting ends (41) which are placed in correspondence with said wide, straight pasta (32), which arrives from a lower opening (45) in said chamber (33).

4. Mixer according to claim 2, characterised in that said vacuum-sealed chamber (33) is characterised by a casing (34), said casing being equipped with sealing gaskets (35) with, respect to said containment cylinder (19a, 19b) and said vacuum tank (37).

5. Mixer according to claim 1, characterised in that said vacuum tank (37) includes a sealed inspection door (42).

6. Mixer according to claim 1, characterised in that said conduit (25) of pasta scrap feeding includes a detection feeler (26) of deposits of said scraps.

7. Mixer according to claim 6, characterised in that said feeler (26) is operatively connected to a driving gearmotor (22) for rotation of said kneading screws (20, 21).

8. Mixer according to claim 1, characterised in that an end portion of said second portion of said kneading screw having a greater diameter (19b) than said containment cylinder (19a, 19b) is associated with an external jacket (27) for the circulation of fluid cooling.

9. Mixer according to claim 1, characterised in that said first portion said kneading screws having a smaller diameter (19a, 20a, 21a) is about 20-30% of said second portion of greater diameter (19b, 20b, 21b).

* * * * *